United States Patent [19]

Houdek

[11] Patent Number: 4,748,704
[45] Date of Patent: Jun. 7, 1988

[54] MULTIPURPOSE FORESTRY IMPLEMENT

[75] Inventor: Miloslav Houdek, Pilsen, Czechoslovakia

[73] Assignee: Zapadoceske statnilesy, podnikove reditelstvi, Pilsen, Czechoslovakia

[21] Appl. No.: 38,108

[22] Filed: Apr. 14, 1987

[30] Foreign Application Priority Data

Oct. 14, 1986 [CS] Czechoslovakia ................. 18770/86

[51] Int. Cl.⁴ ........................... B25F 1/00; B66F 15/00
[52] U.S. Cl. .......................................... 7/143; 7/161; 294/17; 294/26; 254/104
[58] Field of Search .................. 7/143, 161, 146, 147, 7/159, 166; 294/17, 26; 254/104, 131

[56] References Cited

U.S. PATENT DOCUMENTS

| Re. 30,316 | 7/1980 | Dushku | 7/161 |
| D. 55,792 | 7/1920 | Hudgins | 7/166 |
| 310,851 | 1/1885 | Riddel | 7/143 |
| 1,082,952 | 12/1913 | Hobbs | 7/166 |
| 1,679,814 | 8/1928 | Cicero | 7/159 |
| 3,945,065 | 3/1976 | Dushku | 7/161 |

FOREIGN PATENT DOCUMENTS 177190 11/1961 Sweden ........................... 294/17

Primary Examiner—Roscoe V. Parker
Attorney, Agent, or Firm—Kuhn and Muller

[57] ABSTRACT

A multipurpose forestry hand tool for felling trees having the capability of prying cuts in tree trunks, controlling the direction of fall and turning fallen trunks and limbs.

9 Claims, 3 Drawing Sheets

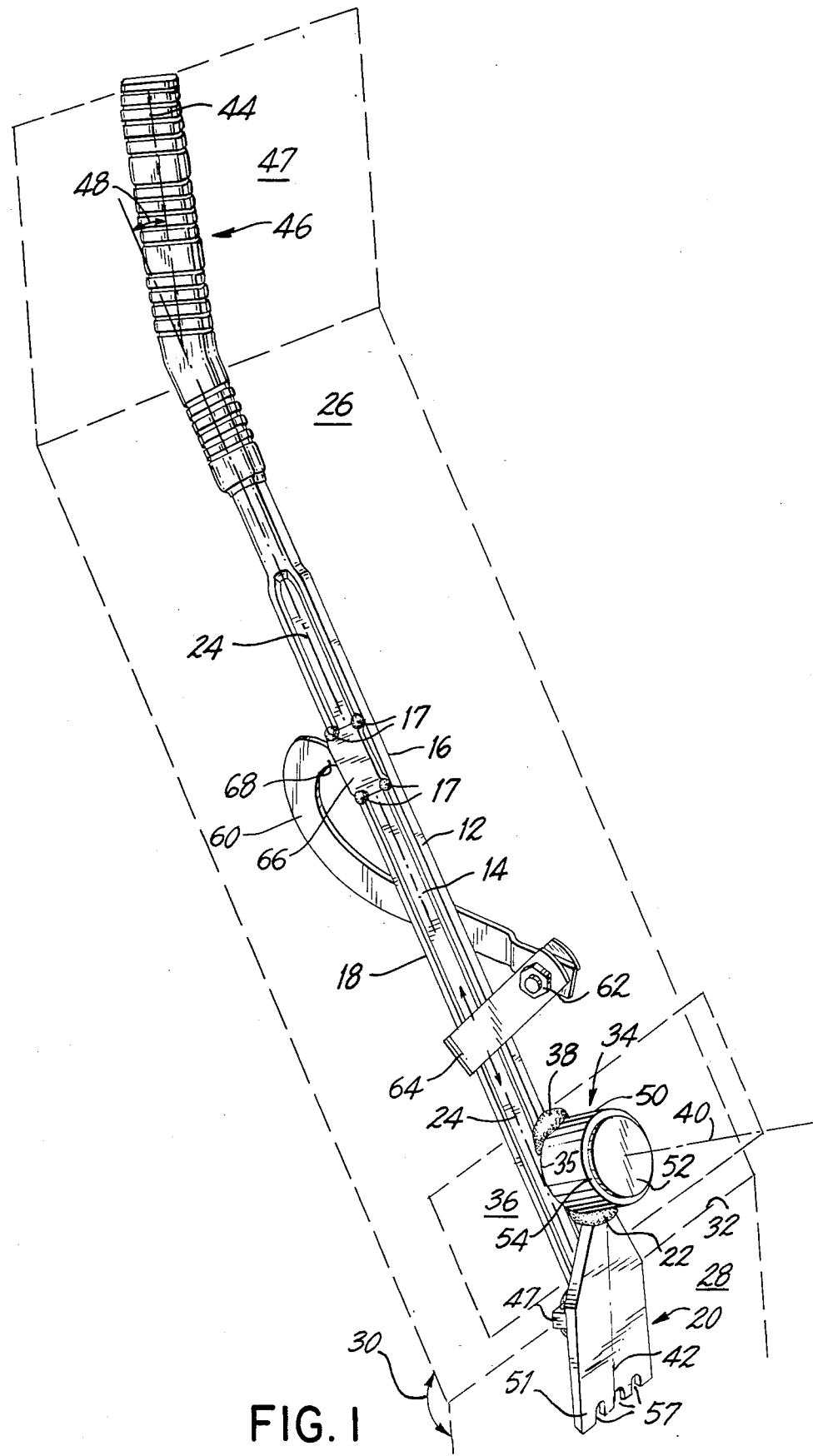
FIG. I

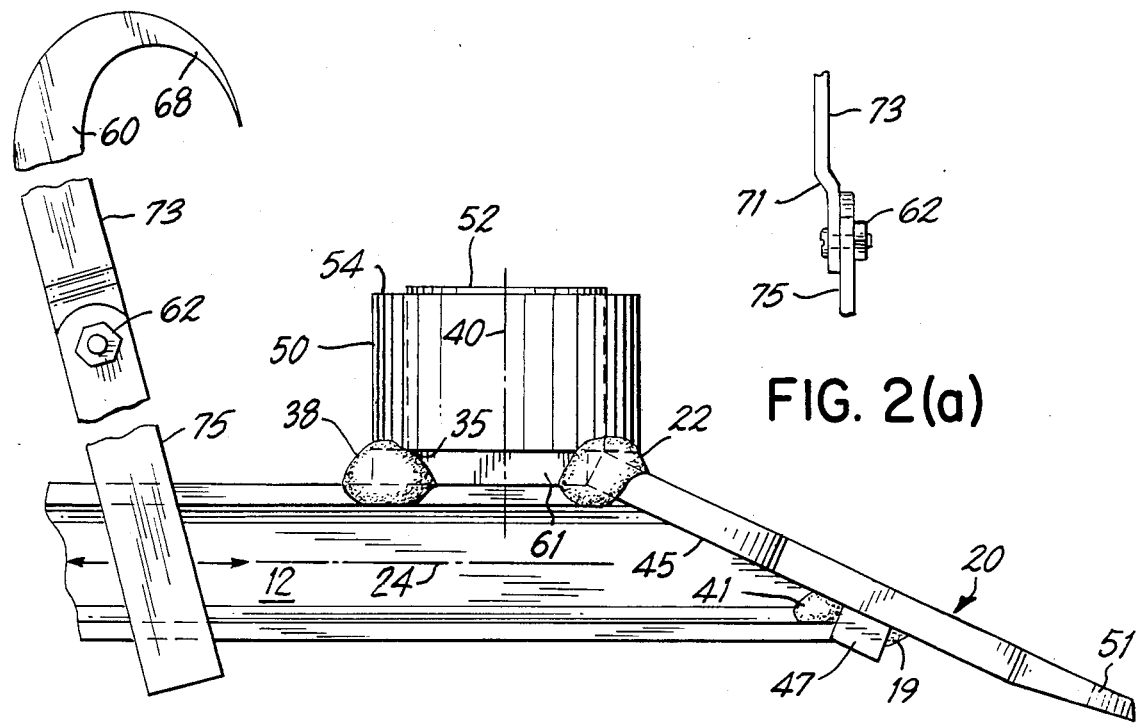
FIG. 2(a)
FIG. 2
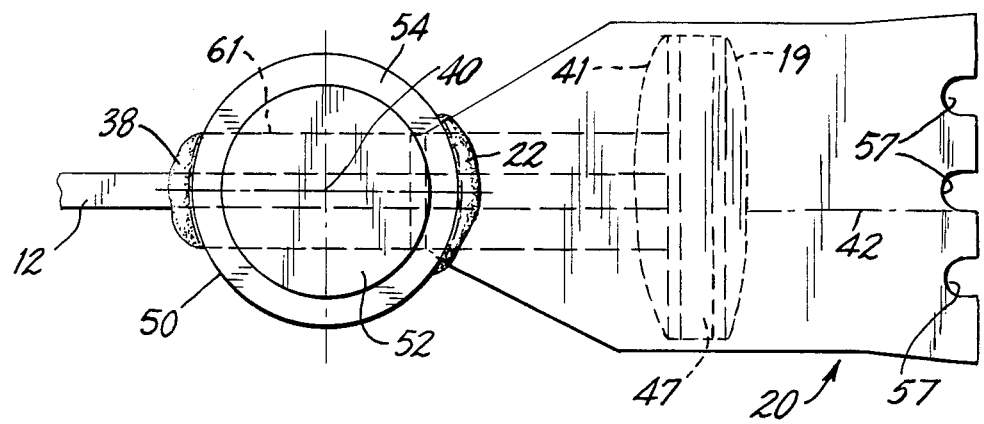
FIG. 2(b)

MULTIPURPOSE FORESTRY IMPLEMENT

The present invention relates to an implement for use in the felling of trees and, more particularly, to a multipurpose forestry implement for use in forestry management and woodcutting.

BACKGROUND OF THE INVENTION

A variety of separate tools and implements are available for use in forestry management and woodcutting techniques which involve the selective felling of trees of various sizes and control of the direction of fall, and the manipulation of the felled trunk and detached limbs. The various prior art implements include axes, splitting hammers, mallets, levers, hooks and the like which have been used separately and alternately in the course of tree-felling, de-limbing and brush removal.

The use of multiple tools for the foregoing purposes is arduous and can involve a safety hazard when working in close confines in a stand of trees.

SUMMARY OF THE INVENTION

In accordance with the present invention there is provided a multipurpose forestry implement which includes a lever arm having a metal spud fixedly attached at one end of the lever arm for insertion into a cut made in a tree trunk, to expand the cut to facilitate wedging and to control the direction of the fall of the trunk; also fixedly attached to the lever arm, closely adjacent to the spud, is a metal ring with its sides engaged with and containing a hard non-metallic material, suitably a hard wood insert, e.g. ash, horn beam, for driving wedges. The lever arm has a slightly skewed, or arched handle member at the end opposite the spud to facilitate both wedging and cut opening. A hinged hook, which is fixed to the lever arm when not in use, is slidably engaged to the lever arm. In use the hook is extended and can be used for turning trunks and limbs. The overall length of the implement of this invention is suitably about 3 feet, enabling its convenient storage and use as a multipurpose hand tool.

BRIEF DESCRIPTION OF THE DRAWINGS

FIG. 1 is an isometric view of the multipurpose forestry implement of the present invention showing major features of the present invention.

FIGS. 2, 2(a) and 2(b) are partial elevation and plan view showing particular details of the present invention

DESCRIPTION OF THE PREFERRED EMBODIMENTS

Figure 3:
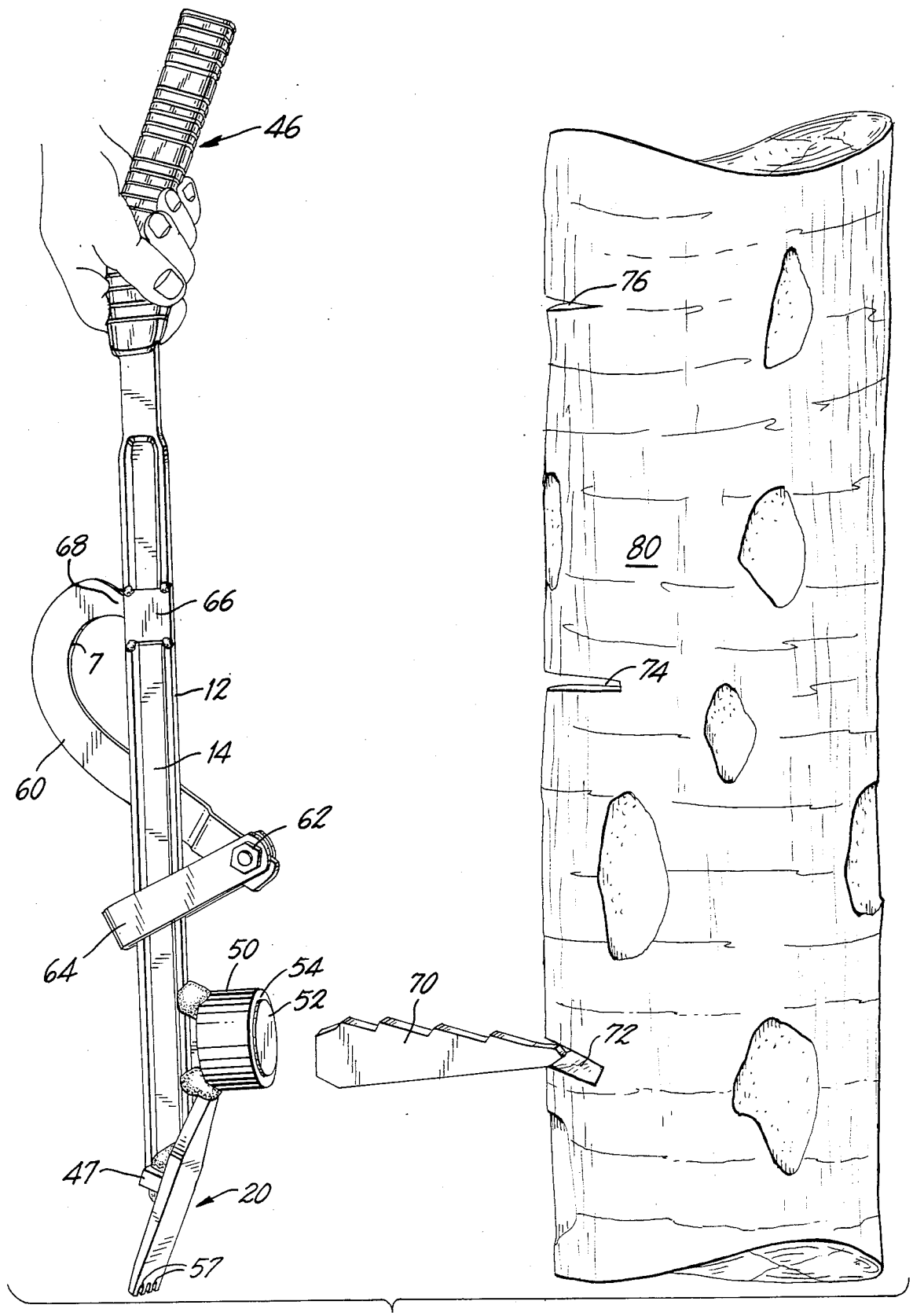
FIG. 3 illustrates the multipurpose forestry implement of the present invention in use.

With reference to the drawing, FIG. 1 in particular, the multipurpose forestry implement of the present invention is indicated generally at 10 comprising a lever arm member 12 suitably formed from steel or iron in the shape of a flat bar or strip having a web 14 and spaced apart flanges 16, 18. A spud 20 in the form of a generally spade-shaped steel plate is fixedly attached at the lower end of lever arm member 12 e.g. by welding as indicated at 22 in FIG. 1.

As illustrated in FIG. 1, the longitudinal axis 24 of lever arm member 12 lies in the plane indicated at 26 while spud member 20 lies in plane 28 which intersects the longitudinal axis 24 of lever arm member 12 at an oblique angle corresponding to the angle shown at 30; plane 28 intersects with plane 26 at line 32 which is perpendicular to the longitudinal axis 24 of lever arm member 12. An open top, ring-shaped member 34 having its base 35 lying in plane 36, which is parallel to plane 26, is fixedly attached to lever arm member 12 by way of weld 38, and to spud 20 and lever arm member 12 by weld 22. The central longitudinal axis 40 of ring-shaped member 34 is perpendicular to plane 26 and to plane 36 and lies in a common plane (perpendicular to planes 26 and 36 and co-extensive with web 14) with the longitudinal axis 24 of lever arm member 12, the longitudinal axis 42 of spud member 20, the cutting edge 7 of hook member 60 when it is disengaged from lever arm 12, and also the longitudinal axis 44 of handle member 46 which is slightly skewed e.g. at an angle of about 5-30 degrees to the longitudinal axis 24 of lever arm member 12 as indicated at 48. The handle member 46 extends in plane 47 in a direction generally opposite to the direction in which spud member 20 extends and, in a particular embodiment, plane 47 is substantially parallel to plane 28. The open top of ring-shaped member 34 faces away from the direction in which spud member 20 extends and the side wall 50 of ring member 34, which is perpendicular to plane 36, is secured to, i.e. clamps cylindrical block 52 which preferably protrudes slightly from ring member 34 as indicated at 54. The multipurpose forestry implement of the present invention also includes a hook member 60 which is hinged using a well known type of lock nut arrangement 62 to a freely sliding yoke 64 which is slidably engaged to lever arm member 12. Hook 60, and yoke 64, suitably made of steel, are, with lock nut arrangement 62, engaged together so as to be sufficiently resilient to permit the engagement of hook 60 in metal hasp 66 which is fixed to lever arm 12, e.g. by welding or rivets at 17. As shown, the tip 68 of hook 60 is deflected i.e. bent around and forced against lever arm member 12 to provide a bearing engagement therewith when inserted in hasp 66.

FIG. 3 shows the multipurpose implement of the present invention being employed to drive a wedge 70 into a cut 72. Spud 20 can be used to force open cuts 74, 76 and control the direction of fall of trunk 80.

With reference to FIGS. 2, 2(a) and 2(b), lever arm member 12, having web 14 and spaced apart flanges 16, 18 is attached to spud 20 at welds 39 and 41; spud 20 lies in contact with the sloping edge 45 of the end of lever arm 12 and is provided with a transverse support bar 47 which is welded to spud 20 at 19 and to support bar 47 and lever arm 12 at 41. Spud 20 is spade-shaped, and tapered, as indicated at 51, and notched or serrated as indicated at 57 to aid in its function of controlling the direction of fall. Open top ring member 34 is affixed to lever arm member 12 by way of a support bar 61 to which it is welded at 38 and 39 and which is likewise welded to lever arm member 12. Yoke 64 is slidable on lever arm member 12 as shown and when hook 60 is disengaged from hasp 66 and extended to a straight position through rotation about lock nut arrangement 62, the hinged ports 73, 75 are held aligned by a conventional locking arrangement and hook 60 is available for turning fallen tree trunks and detached tree limbs. As shown in FIG. 2(a) hinged portions 73 is bent at 77 so that the point of hook 60 can pass around lever arm member 12 to engage hasp 66. The tension of lock nut arrangement 62 enables a high friction bearing contact between hook 60 and lever arm 12 when hook 60 is folded to engage hasp 66.

Particular advantages of the present invention are the versatility and safety enhancement and ease of use and storage due to its compact size. Efficiency as well as safety is enhanced by not having to store and use a variety of tools for prying, wedging, controlled felling and turning which are enabled by the single multipurpose forestry implement of the present invention. The shape, i.e. configuration of the multipurpose tool of the present invention is anatomically comfortable and convenient to use in addition to its safety features.

What is claimed is:

1. A multipurpose forestry tool comprising a lever arm member having a longitudinal axis lying in a first plane; a substantially flat spud member fixedly attached to said lever arms at one end of said lever arm and lying in a second plane which intersects the longitudinal axis of said lever arm at an oblique angle and which intersects said first plane in a line which is perpendicular to said longitudinal axis of said lever arm, said spud member extending away from said lever arm at an obtuse exterior angle; an open-top ring member having its base lying in a plane which is parallel to said first plane having its open top facing away from the direction in which the spud member extends and having its central longitudinal axis perpendicular to said first plane; and a disk of hard material fixedly secured within said ring member.

2. Apparatus in accordance with claim 1 wherein a handle member is fixedly attached to said lever arm at the end thereof remote from said spud member extending at an angle with said lever arm generally opposite to said spud member.

3. Apparatus in accordance with claim 1 wherein a yoke member is slidably engaged with said lever arm and a hook member, adapted to be removably engaged with said lever arm is rotatably engaged to said yoke, the edge of said hook member lying in a common plane with the longitudinal axis of said lever arm when said hook member is disengaged from said lever arm.

4. Apparatus in accordance with claim 1 wherein the end of said spud member remote from said lever arm is tapered and notched.

5. Apparatus in accordance with claim 1 wherein said spud member is attached to said lever arm by welds.

6. Apparatus in accordance with claim 1 and claim 2 wherein the longitudinal axes of the lever arm, spud member and handle lie substantially in a common plane.

7. Apparatus in accordance with claim 3 wherein a hasp is welded to the lever arm for removably engaging the tip of said hook member.

8. Apparatus in accordance with claim 1 wherein said disk is made of wood and protrudes slightly above said metal ring.

9. A multipurpose forestry implement comprising a lever arm, a hand grip-shaped handle fixedly connected to said lever arm and being slightly arched with respect to the lever arm, said lever arm being in the form of a flat metal bar, a hook member engaged to said lever arm, a metal ring surrounding a block of wood attached to said lever arm, and a flat metal plate attached to said lever arm below said metal ring.

* * * * *